(12) United States Patent
Hyodo et al.

(10) Patent No.: US 8,468,818 B2
(45) Date of Patent: Jun. 25, 2013

(54) HST COOLING CIRCUIT

(75) Inventors: Koji Hyodo, Kasumigaura (JP); Kazuo Ishida, Ryugasaki (JP); Tsuyoshi Takeyama, Ryugasaki (JP); Tadayoshi Aoki, Ryugasaki (JP); Takehiko Katsuragi, Kasumigaura (JP); Shoroku Kawahara, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 916 days.

(21) Appl. No.: 12/530,930

(22) PCT Filed: Mar. 12, 2008

(86) PCT No.: PCT/JP2008/054521
§ 371 (c)(1),
(2), (4) Date: Sep. 11, 2009

(87) PCT Pub. No.: WO2008/126605
PCT Pub. Date: Oct. 23, 2008

(65) Prior Publication Data
US 2010/0095664 A1 Apr. 22, 2010

(30) Foreign Application Priority Data
Mar. 13, 2007 (JP) .................................. 2007-063492

(51) Int. Cl.
*F16D 31/02* (2006.01)
(52) U.S. Cl.
USPC ............................................. 60/456; 60/484
(58) Field of Classification Search
USPC .................. 60/456, 464, 484, 490, 912, 487, 60/488, 489, 491, 492, 444, 428, 708, 714; 180/305, 306, 307
See application file for complete search history.

(56) References Cited

U.S. PATENT DOCUMENTS 3,952,511 A * 4/1976 Turner et al. .................... 60/430
4,376,371 A * 3/1983 Kojima et al. .................. 60/420
(Continued)

FOREIGN PATENT DOCUMENTS
EP 1 600 666 A1 11/2005
JP 56-134452 10/1981
(Continued)

OTHER PUBLICATIONS
The Extended European Search Report dated Aug. 5, 2011 (Four (4) pages).
(Continued)

*Primary Examiner* — Edward Look
*Assistant Examiner* — Michael Quandt
(74) *Attorney, Agent, or Firm* — Crowell & Moring LLP

(57) ABSTRACT

There are provided: an HST hydraulic circuit that is formed through a closed circuit connection of a variable displacement hydraulic pump 2 and first and second variable displacement hydraulic motors 3 and 4; a charge pump 6 that replenishes the HST hydraulic circuit with hydraulic oil; a cooling circuit through which an excess of the hydraulic oil that has been replenished from the charge pump 6 to the HST hydraulic circuit is returned to a reservoir through the hydraulic pump 2, the first hydraulic motor 3, and the second hydraulic motor 4; a hydraulic source 7 that supplies hydraulic oil to an hydraulic device other than the first and second hydraulic motors; and a merge circuit through which a portion of hydraulic oil from the hydraulic source 7 is merged into an intermediate oil line 22 that lies downstream of the first hydraulic motor 3 and upstream of the second hydraulic motor 4 in the cooling circuit.

6 Claims, 2 Drawing Sheets

U.S. PATENT DOCUMENTS

| | | | |
|---|---|---|---|
| 4,402,181 A * | 9/1983 | Acker et al. | 60/427 |
| 4,554,992 A * | 11/1985 | Kassai | 180/307 |
| 6,508,328 B1 * | 1/2003 | Kenyon et al. | 180/308 |
| 7,299,891 B2 * | 11/2007 | Legner | 180/307 |
| 7,409,827 B2 * | 8/2008 | Yasuda et al. | 60/456 |
| 2006/0048509 A1 | 3/2006 | Umemura et al. | |

FOREIGN PATENT DOCUMENTS

| | | |
|---|---|---|
| JP | 62-5935 Y2 | 2/1987 |
| JP | 2-8504 A | 1/1990 |
| JP | 2001-253789 A | 9/2001 |
| JP | 2003-148611 A | 5/2003 |
| JP | 2003-156121 | 5/2003 |
| JP | 2004-74883 A | 3/2004 |
| JP | 2005-54964 A | 3/2005 |
| JP | 2005-121158 A | 5/2005 |

OTHER PUBLICATIONS

International Search Report dated Jun. 24, 2008 (Two (2) pages).

* cited by examiner

HST COOLING CIRCUIT

TECHNICAL FIELD

The present invention relates to an HST (hydrostatic transmission) cooling circuit that cools an HST hydraulic circuit that is constituted through a closed circuit connection of a hydraulic pump and a hydraulic motor.

BACKGROUND ART

A charge pump is provided in the HST hydraulic circuit so as to replenish the hydraulic circuit with oil. There are circuits known in the related art that cool HST hydraulic circuits by pressure oil (i.e., pressurized hydraulic oil) from charge pumps (refer to, for example, Patent Reference Literature #1). In the circuit disclosed in Patent Reference Literature #1, pressure oil from the charge pump that is relieved through a charge relief valve is guided to a reservoir through a pump case, a motor case, and an oil cooler.

Patent Reference Literature 1: Japanese Laid Open Patent Publication No. 2005-54964

DISCLOSURE OF THE INVENTION

Problems to be Solved by the Invention

However, temperature of pressure oil from the charge pump rises when it flows through the pump case and the motor case. Therefore, in the event that, for instance, a plurality of hydraulic motors are provided in an HST hydraulic circuit, a downstream hydraulic motor cannot be cooled sufficiently by means of flow of pressure oil from the charge pump through the pump case and the motor case as disclosed in Patent Reference Literature #1.

Means for Solving the Problems

An HST cooling circuit according to the present invention comprises: an HST hydraulic circuit that is formed through a closed circuit connection of a variable displacement hydraulic pump and at least first and second variable displacement hydraulic motors; a charge pump that replenishes the HST hydraulic circuit with hydraulic oil; a cooling circuit through which an excess of the hydraulic oil that has been replenished from the charge pump to the HST hydraulic circuit is returned to a reservoir through at least a drain port of the hydraulic pump, the first hydraulic motor, and the second hydraulic motor; a hydraulic source that supplies hydraulic oil to an hydraulic device other than the first and second hydraulic motors; and a merge circuit through which a portion of hydraulic oil from the hydraulic source is merged into an intermediate oil line that lies downstream of the first hydraulic motor and upstream of the second hydraulic motor in the cooling circuit.

The merge circuit can be formed with a charge valve through which pressure oil supplied from the hydraulic source to the hydraulic device is charged, and a return oil line through which a leak of oil from the charge valve is guided to the intermediate oil line.

It is preferable that the said hydraulic source is a low capacity hydraulic pump having a capacity lower than a capacity of a working hydraulic pump that supplies hydraulic oil to a working actuator.

For instance, a charge pump may be employed that charges pressure oil which is required to activate a travel brake.

An oil cooler may be provided downstream of the second hydraulic motor of the cooling circuit, and a relief unit may be further included that returns hydraulic oil in the intermediate oil line to a reservoir through neither the second motor nor the oil cooler when pressure in the intermediate oil line becomes equal to or greater than a predetermined value.

A gearbox may be further included that transmits output of the first and second hydraulic motors to a traveling output shaft.

Advantageous Effect of the Invention

According to the present invention, leak of hydraulic oil that is supplied from a hydraulic source to a hydraulic device merges into an oil line between first and second hydraulic motors in the cooling circuit. This allows a plurality of motors in the HST hydraulic circuit to be cooled efficiently.

BEST MODE FOR CARRYING OUT THE INVENTION

Figure 1:
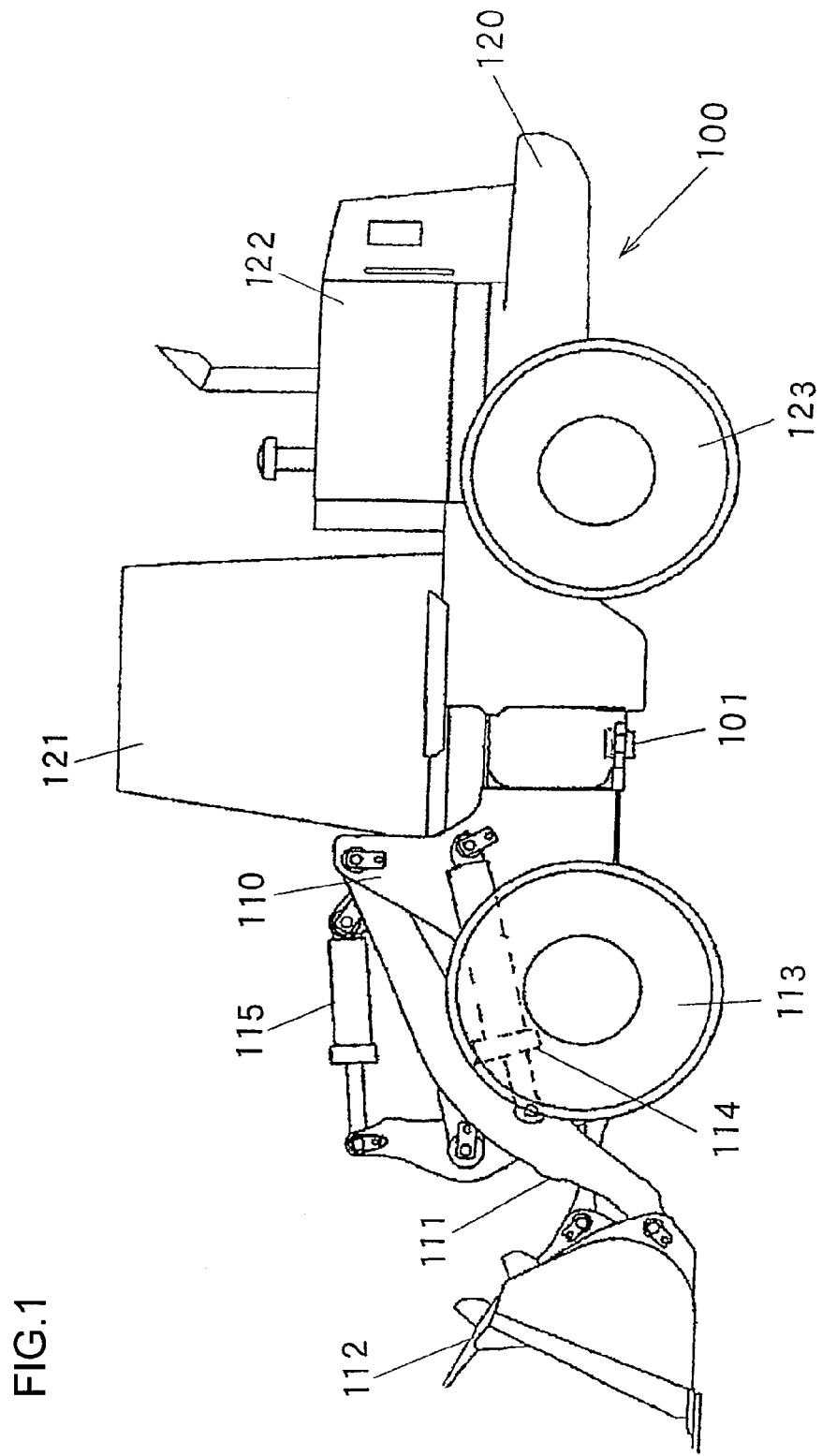
FIG. 1 A side view of a wheel loader that is an example of a working vehicle that includes a HST cooling circuit according to an embodiment of the present invention.
Figure 2:
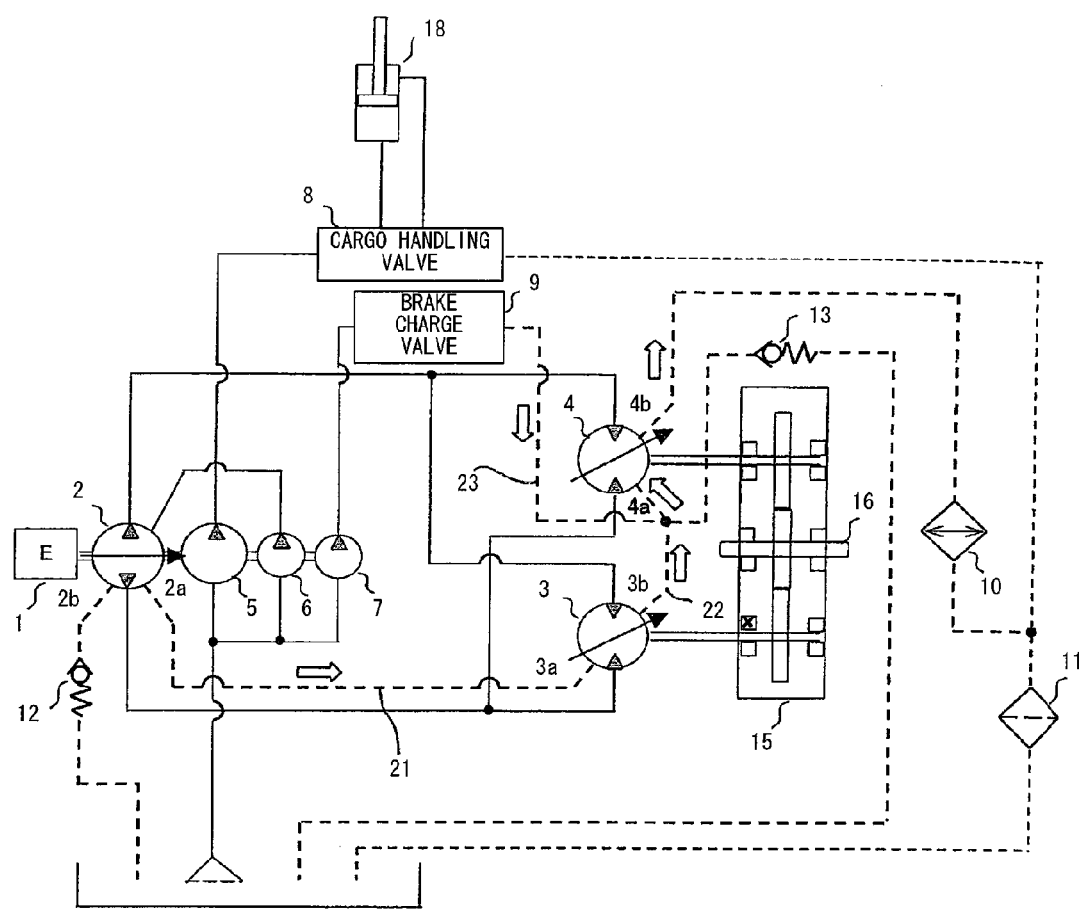
FIG. 2 A hydraulic circuit diagram showing structure of the HST cooling circuit according to the present embodiment.

The following is an explanation of an embodiment of the HST cooling circuit according to the present invention, given in reference to FIGS. 1 and 2. FIG. 1 is a side view of a wheel loader that is an example of a working vehicle that includes the HST cooling circuit according to the present embodiment. A wheel loader 100 is constituted by a front body 110 that includes an arm 111, a bucket 112, tires 113, and a rear body 120 that includes a driver's cab 121, an engine room 122, tires 123. The arm 111 vertically rotates (moves up and down) by drive of an arm cylinder 114, whereas the bucket 112 vertically rotates (dumps or crowds) by drive of a bucket cylinder 115. The front body 110 and the rear body 120 are rotatably connected to each other by a center pin 101. Expansion and contraction of a steering cylinder (not figured herein) causes the front body 110 to move right and left relative to the rear body 120.

FIG. 1 is a side view of a wheel loader that is an example of a working vehicle that includes the HST cooling circuit according to the present embodiment. A wheel loader 100 is constituted by a front body 110 that includes an arm 111, a bucket 112, tires 113, and so on and a rear body 120 that includes a driver's cab 121, an engine room 122, tires 123, and so on. The arm 111 vertically rotates (moves up and down) by drive of an arm cylinder 114, whereas the bucket 112 vertically rotates (dumps or crowds) by drive of a bucket cylinder 115. The front body 110 and the rear body 120 are rotatably connected to each other by a center pin 101. Expansion and contraction of a steering cylinder (not figured herein) causes the front body 110 to move right and left relative to the rear body 120.

FIG. 2 is a hydraulic circuit diagram showing structure of the HST cooling circuit according to the present embodiment. The HST hydraulic circuit includes a variable displacement hydraulic pump 2 that is driven by an engine 1 and a pair of variable displacement hydraulic motors 3 and 4 that are connected in a closed circuit in parallel with each other to the hydraulic pump 2. Outputs of the hydraulic motors 3 and 4 are input to a gearbox 15 and transmitted to an output shaft 16 thereof. Rotation of the output shaft 16 is transmitted to the tires 113 and 123 via a propeller shaft and an axle which are not figured herein, so that the vehicle travels. In the present embodiment, since the output shaft 16 is driven by a plurality of the hydraulic motors 3 and 4, a great travel driving force can be realized.

Discharge direction of pressure oil of the hydraulic pump 2 is changed by operation of a switching valve which is not figured herein. This causes rotation direction of the hydraulic motors 3 and 4 to change, so that the forward/reverse motion of the vehicle switches. The rotation speed of the engine 1 increases with an increase in the depression amount of an accelerator pedal (not figured). The displacement of the hydraulic pump 2 is increased by actuation of a known pump displacement control device with an increase in the depression amount of the accelerator pedal. In this manner, the rotation rate and the displacement of the hydraulic pump 2 both increase as the depression amount of the accelerator pedal increases, so that the pump discharge amount increases. The displacements of the hydraulic motors 3 and 4 are increased by actuation of known motor displacement control devices with an increase in travel drive pressure. This allows the vehicle to travel with a drive torque which corresponds to the travel load.

A hydraulic pump 5 is a high capacity hydraulic pump for working machine that is driven by the engine 1. Pressure oil is guided from the hydraulic pump 5 to a hydraulic cylinder 18 which is, for example, the arm cylinder 114, the bucket cylinder 115, or the like through a cargo handling valve 8. Return oil returns from the hydraulic cylinder 18 to the reservoir through the cargo handling valve 8 and a return filter 11.

A charge pump 6 is driven by the engine 1. Pressure oil is guided from the charge pump 6 to the hydraulic pump 2 so as to replenish the HST hydraulic circuit with hydraulic oil. The flow of pressure oil from the charge pump 6 forms a circulation path for cooling the hydraulic pump 2. An excess of oil delivered from the charge pump 6 is discharged to the oil line 21 via a drain port 2a of the hydraulic pump 2. The hydraulic motors 3 and 4 are each provided with a pair of drain ports for oil inflow and oil outflow, that is, drain ports 3a and 4a and drain ports 3b and 4b. Oil flowing through the oil line 21 flows through the hydraulic motor 3 via the drain ports 3a and 3b, and then flows through a hydraulic motor 4 via the drain ports 4a and 4b.

A hydraulic pump 7 is a low capacity charge pump for brake that is driven by the engine 1. The wheel loader 100 has a hydraulic brake system, in which depression of a brake pedal causes pressure oil to be applied to a travel brake device so as to actuate a travel brake. Therefore, pressure oil is guided from the hydraulic pump 7 to a brake charge valve 9 so as to maintain pressure for activating brake, or the pressure oil is charged in an accumulator for supplying brake pressure, in order to prepare for activation of the travel brake. An excess of oil guided to the brake charge valve 9 flows through an oil line 23, merges into the oil flowing from the charge pump 6 through the hydraulic motor 3 in an oil line 22 between the hydraulic motors 3 and 4, and then flows through the hydraulic motor 4. The oil that has flowed out of the hydraulic motor 4 via the drain port 4b is cooled through an oil cooler 10 before returning to the reservoir through the return filter 11.

A low pressure check valve 13, which relieves pressure oil in the oil line 22 to the reservoir when pressure in the oil line 22 becomes equal to or greater than a predetermined value P1, is connected to the oil line 22 between the hydraulic motors 3 and 4. Similarly, a low pressure check valve 12, which relieves pressure oil to the reservoir via a drain port 2b when pressure at the drain port 2b becomes equal to or greater than a predetermined value P2, is connected to the drain port 2b of the hydraulic pump 2.

Operations of the HST cooling circuit according to the present embodiment are now explained.

A portion of the pressure oil discharged from the charge pump 6 by drive of the engine 1 is replenished to the HST hydraulic circuit, and the rest of the pressure oil flows through in order of the hydraulic pump 2, the oil line 21, the hydraulic motors 3 and 4, and the oil cooler 10. Pressure oil from the charge pump 6 cools the hydraulic oil of the HST hydraulic circuit, and also cools the hydraulic pump 2 and the hydraulic motors 3 and 4. At this time, pressure oil discharged from the hydraulic pump 7 by drive of the engine 1 flows in the oil line 23 via the brake charge valve 9 and merges into the oil from the charge pump 6 downstream of the hydraulic motor 3. This prevents cooling oil temperature from rising downstream of the hydraulic motor 3 and a greater amount of oil flows through the hydraulic motor 4 than that flows through the upstream hydraulic motor 3, thereby cooling the hydraulic motor 4 efficiently.

When hydraulic oil temperature is low upon starting the engine or the like, pressure in the oil line 22 rises. When pressure in the oil line 22 becomes equal to or greater than the predetermined value P1, the low pressure check valve 13 opens so that pressure oil in the oil line 22 is relieved to the reservoir. This prevents high pressure from being applied to the drain ports 3a, 3b, 4a, and 4b of the motors 3 and 4 and the oil cooler 10, thereby preventing those hydraulic devices from being damaged. When hydraulic oil temperature is low, pressure at the drain port 2b of the hydraulic pump 2 also rises. When pressure at the drain port 2b becomes equal to or greater than the predetermined value P2, the low pressure check valve 12 opens so that pressure oil is relieved via the drain port 2b to the reservoir. This prevents high pressure which is equal to or greater than the predetermined value P2 from being applied to the drain port 2b, thereby preventing the hydraulic pump 2 from being damaged. Since cooling oil does not flow through the oil cooler 10 when the low pressure check valves 12 and 13 open, hydraulic oil temperature can be raised rapidly.

According to the present embodiment, the following operational effects can be achieved.

(1) The hydraulic pump 2, the oil line 21, the hydraulic motor 3, the oil line 22, the hydraulic motor 4, and the oil cooler 10 are connected in series so as to form a cooling circuit through which drain oil flows from the charge pump 6 via the hydraulic pump 2 drain port 2a, and pressure oil which is guided from the hydraulic pump 7 to the brake charge valve 9 merges into the oil line 22. This allows a plurality of the hydraulic motors 3 and 4 to be cooled simultaneously and efficiently.

(2) Since pressure oil is guided from the low capacity hydraulic pump 7 to the oil line 22 through the brake charge valve 9, the piping size of a merge circuit from the brake charge valve 9 to the oil line 22 can be reduced. On the other hand, in the event that pressure oil is guided from a circuit for working machine (e.g., the cargo handling valve 8) to the oil line 22, the outlet amount of the hydraulic pump 5 is large and flow rate that flows through the merge circuit increases. In the event that the hydraulic cylinder 18 is operated downwards, since return oil amount increases by an amount in correspondence to area ratio of a rod chamber and a bottom chamber, flow rate that flows through the merge circuit increases more. This makes it difficult to reduce the piping size, thereby requiring more space so as to form the merge circuit.

(3) Since the low pressure check valve 13 is connected to the oil line 22 between the hydraulic motors 3 and 4, pressure in the oil line 22 can be limited to equal to or less than the predetermined value P1 even if the hydraulic oil temperature is low, thereby preventing the hydraulic motors 3 and 4 and the oil cooler 10 from being damaged. In addition, since hydraulic oil does not flow through the oil cooler 10 when the hydraulic oil temperature is low, the hydraulic oil temperature can be raised rapidly.

(4) Since pressure oil is guided from the hydraulic pump 7 to the downstream hydraulic motor 4 through the brake charge valve 9, it is not necessary to increase flow rate of the oil line 21, so that it is not necessary to increase the charge pump 6 in size.

(5) Since the output shaft 16 is driven by a plurality of the hydraulic motors 3 and 4 through the gearbox 15, a great travel driving force can be realized.

It is to be noted that although in the above embodiment the HST hydraulic pump 2, the HST hydraulic motors 3 and 4, and the oil cooler 10 are connected in series so as to form a cooling circuit, and a merge circuit is formed, through which a portion of the hydraulic oil supplied from the low capacity hydraulic pump 7 to the brake charge valve 9 is merged into the oil line (intermediate oil line) 22 between the hydraulic motors 3 and 4 through the oil line 23 (return oil line), the structures of the cooling circuit and the merge circuit are not limited to those described above.

For example, a portion of the hydraulic oil that applies to other hydraulic devices such as a charge valve for cargo handling operation may be merged into the oil line 22 in place of merging pressure oil applied to the brake charge valve 9. In other words, in a system where a cargo handling valve is hydraulically operated, pressure which serves as a hydraulic source for operating the cargo handling valve is maintained or the pressure oil is charged in an accumulator, so that the remaining oil is discharged via the charge valve for cargo handling operation, and thus, the discharged oil may be merged into the oil line 22. Not only brake pressure but also pressure for cargo handling operation may be charged via the brake charge valve 9. Oil other than return oil from the charge valve may be guided to the intermediate oil line. For instance, a portion of the hydraulic oil supplied to the cargo handling valve 8 may be guided to the intermediate oil line 22. A hydraulic source other than the hydraulic pump 7 may be used as a hydraulic source for merging as long as it supplies the hydraulic oil to other hydraulic devices than the hydraulic motors 3 and 4. Although pressure in the oil line 22 is relieved through the low pressure check valve 13 when the pressure in the oil line 22 becomes equal to or greater than the predetermined value P1, a relief unit is not limited to this example.

While an explanation is given above on an example in which the HST cooling circuit of the present invention is adopted in a wheel loader, the present invention may also be adopted in other types of working vehicles. Namely, as long as the features and functions of the present invention are realized effectively, the present invention is not limited to a travel control apparatus achieved in the embodiment.

The disclosure of the following priority application is herein incorporated by reference:

Japanese Patent Application No. 2007-63492 (filed on Mar. 13, 2007)

The invention claimed is:

1. An HST cooling circuit, comprising:
an HST hydraulic circuit that is formed through a closed circuit connection of a variable displacement hydraulic pump and at least first and second variable displacement hydraulic motors;
a charge pump that replenishes the HST hydraulic circuit with hydraulic oil;
a cooling circuit that comprises a first oil line that is connected to a drain port of the variable displacement hydraulic pump and to a drain port for oil inflow of the first hydraulic motor, a second oil line that is connected to a drain port for oil outflow of the first hydraulic motor and to a drain port for oil inflow of the second hydraulic motor, and a third oil line that is connected to a drain port for oil outflow of the second hydraulic motor and to a reservoir, wherein through the cooling circuit an excess of the hydraulic oil that has been replenished from the charge pump to the HST hydraulic circuit is returned to the reservoir through at least, and in the order of, the drain port of the variable displacement hydraulic pump, the first hydraulic motor, and the second hydraulic motor;
a hydraulic source that supplies hydraulic oil to an hydraulic device other than the first and second hydraulic motors; and
a merge circuit through which a portion of hydraulic oil from the hydraulic source is merged into the second oil line that lies downstream of the first hydraulic motor and upstream of the second hydraulic motor in the cooling circuit.

2. An HST cooling circuit according to claim 1, wherein:
the merge circuit includes:
a charge valve through which hydraulic oil supplied from the hydraulic source to the hydraulic device is charged; and
a return oil line through which a leak of hydraulic oil from the charge valve is guided to the second oil line.

3. An HST cooling circuit according to claim 1, wherein:
the hydraulic source is a low capacity hydraulic pump having a capacity lower than a capacity of a working hydraulic pump that supplies hydraulic oil to a working actuator.

4. An HST cooling circuit according to claim 3, wherein:
the low capacity hydraulic pump is a charge pump that charges hydraulic oil which is required to activate a travel brake.

5. An HST cooling circuit according to claim 1, wherein:
an oil cooler is provided downstream of the second hydraulic motor of the cooling circuit; and
the HST cooling circuit further comprises a relief unit that returns hydraulic oil in the second oil line to a reservoir through neither the second motor nor the oil cooler when pressure in the second oil line becomes equal to or greater than a predetermined value.

6. An HST cooling circuit according claim 1, comprising:
a gearbox that transmits output of the first and second hydraulic motors to a traveling output shaft.

* * * * *